United States Patent [19]
Kent et al.

[11] 4,017,166
[45] Apr. 12, 1977

[54] MOTION PICTURE FILM FOR THREE DIMENSIONAL PROJECTION

[75] Inventors: Arthur P. Kent, Forest Hills; Mortimer Marks, Beechhurst, both of N.Y.

[73] Assignee: Marks Polarized Corporation, Whitestone, N.Y.

[22] Filed: Nov. 18, 1974

[21] Appl. No.: 524,798

Related U.S. Application Data

[63] Continuation-in-part of Ser. No. 329,733, Feb. 5, 1973, Pat. No. 3,851,955.

[52] U.S. Cl. .................................. 352/57; 350/132
[51] Int. Cl.² ........................................ G03B 35/00
[58] Field of Search ............... 352/57, 60; 350/130, 350/132, 133, 137, 138, 139, 143

[56] References Cited

UNITED STATES PATENTS

| | | | |
|---|---|---|---|
| 2,329,294 | 9/1943 | Ramsdell | 352/57 |
| 2,843,006 | 7/1958 | Tyler | 352/109 |
| 3,143,032 | 8/1964 | Cednas | 352/60 |
| 3,189,915 | 6/1965 | Tondreau | 352/60 |
| 3,339,998 | 9/1967 | Hoch | 352/57 |
| 3,363,966 | 1/1968 | Hoch | 352/60 |
| 3,432,228 | 3/1969 | Hellmund | 352/169 |
| 3,533,688 | 10/1970 | Painton | 352/169 |

*Primary Examiner*—Monroe H. Hayes

[57] ABSTRACT

Stereo pairs which have printed on a single film strip are directed and focused upon a screen by an attachment for a standard motion picture projector. The images are overlapped and polarized at right angles to the other upon the screen by an optical device having abutting elements. The stereo pairs on the film are separated by an opaque band to define the edges of the projected image and mask element abutment. Indicia marks are provided on the film to enable the positioning of the right and left images on the film in the gate to avoid pseudo stereo projection. A film format for stereo pairs uses a dark bar centered at the aperture on the film or gate.

2 Claims, 18 Drawing Figures

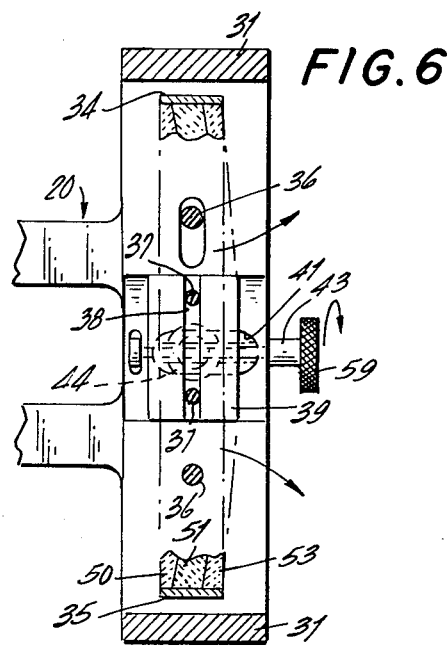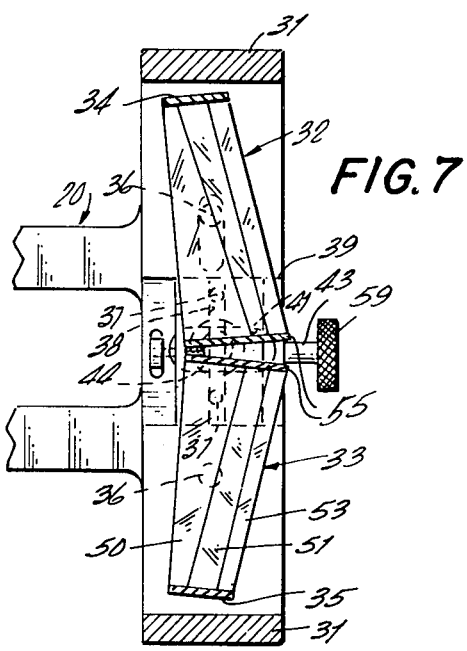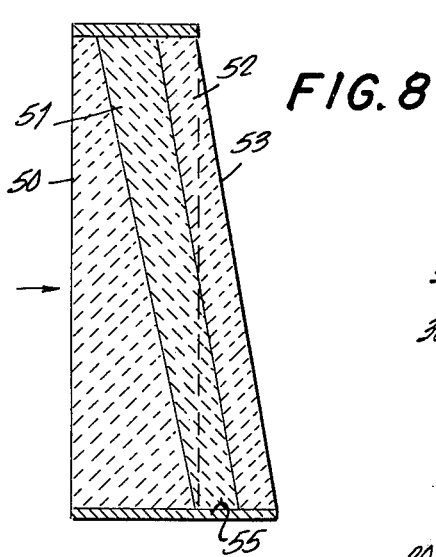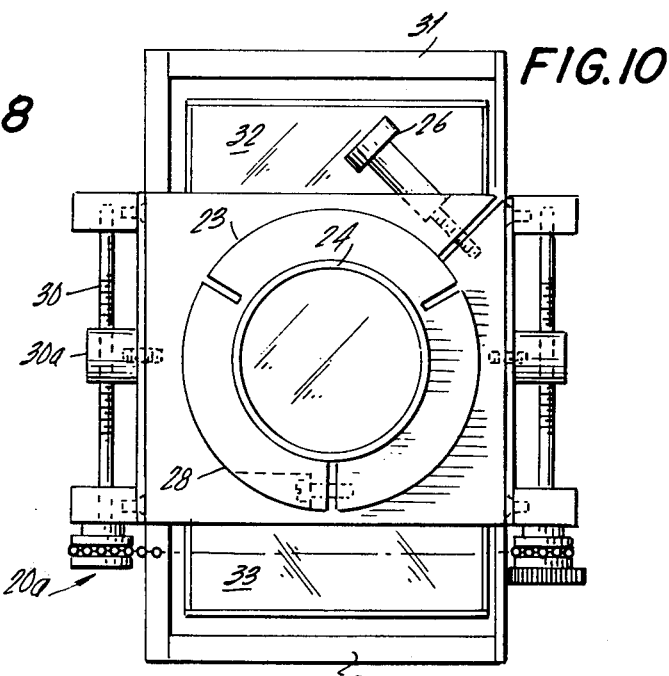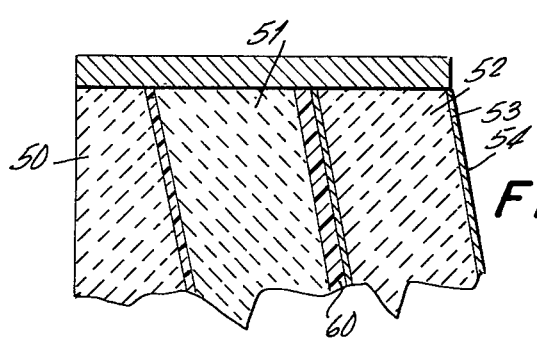

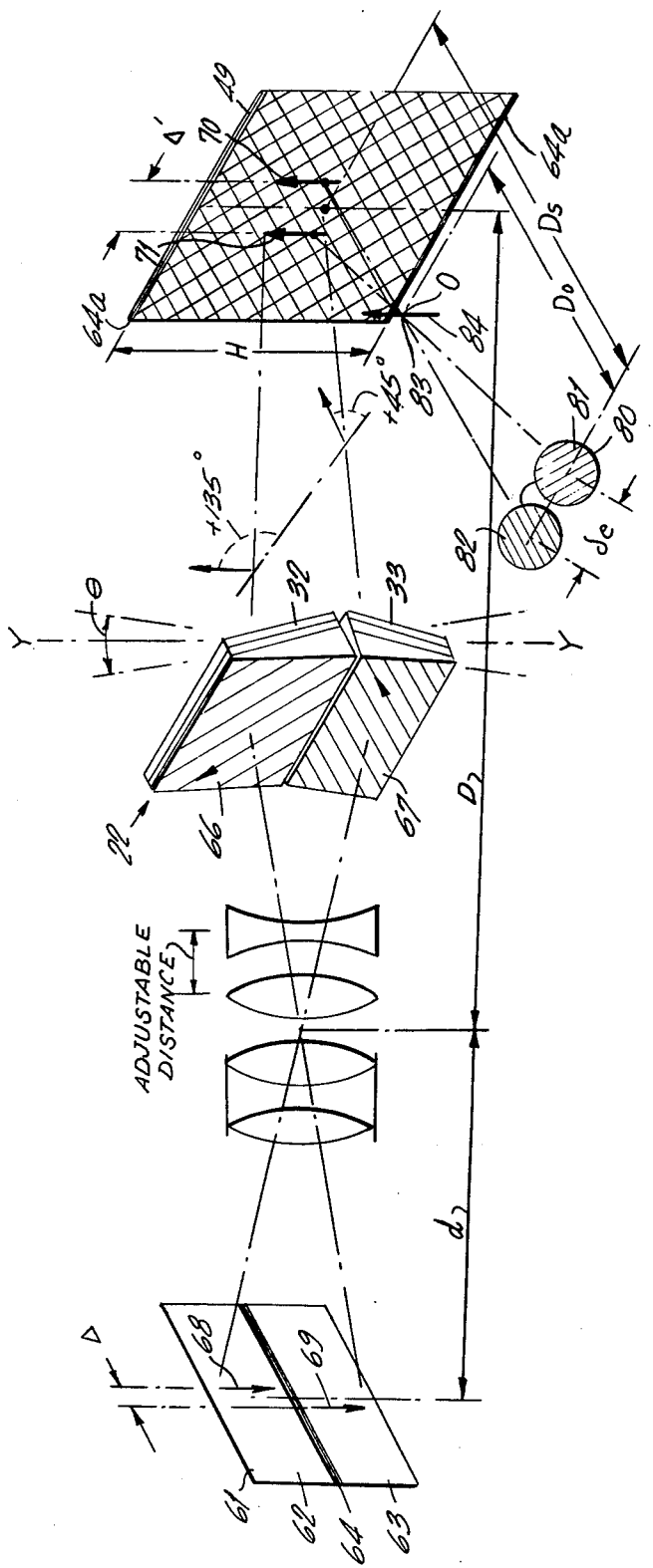

MOTION PICTURE FILM FOR THREE DIMENSIONAL PROJECTION

BACKGROUND OF THE INVENTION

This application is a continuation-in-part of an application for patent entitled "Apparatus For Converting Motion Picture Projectors For Stereo Display" filed Feb. 5, 1973, Ser. No. 329,733, now U.S. Pat. No. 3,851,955, in the name of Arthur P. Kent, et al.

Stereoscopic motion pictures have been displayed by simultaneously projecting right and left stereo images upon a screen in overlapped relationship while transmitting the light of each image through mutually extinguishing filters, and viewing the overlapped images on the screen through the same mutually extinguishing filters. These filters may comprise colored filters such as red and green, or polarizing filters disposed with their planes of polarization normal to each other.

Prior art devices have used two projectors and two film strips to overlap the projected stereo images upon the screen, one projector having the film for right eye images and the other for left eye images. In the two projector systems, the images were difficult to synchronize, adjustment of the position of the overlapped images was time consuming, the image light intensities were frequently out of balance. Such systems also necessitated the additional expenses of twice as much film as standard motion pictures, extra handling in the projection booth, frequent monitoring, etc. As a result of these technical difficulties and extra costs, the two projector stereoscopic process is no longer used by the motion picture industry.

It has been proposed to print left and right motion picture stereo pictures on a single film frame and to project them simultaneously using a single projector. The stereo pictures may be printed side by side upon the film or one above the other. Mirrors and other optical devices have then been employed to bring the two images into overlapping relationship upon the screen. Such optical devices, however, have had substantial light loss resulting in dull, unsatisfactory projection. Moreover, prior art optical devices employed for stereo projection of single strip stereo images are bulky, difficult to adjust and often require substantial modification for use with the standard motion picture projector.

In this invention the film comprises a pair of stereo pictures with a dark bar centered in a conventional film gate.

Dark bars of equal widths separating images are conventional to films produced by the motion picture industry since the beginning of the century. However, these dark bars are always placed at the rim of the film gate. The dark bar may overlap the edge of the film gate or be hidden entirely, depending on the relative dimensions of the film frame and the gate.

In the present invention two images are placed within a single frame displayed in a single conventional gate, and the dark bar is located at the center of the gate.

The central dark bar and film frame separator strips may be of equal widths, different widths, or in an optimum ratio. The relative positions of the right and left images in the film gate are not easily distinguished. If the correct position of the right and left images in the film gate is reversed then the projected images will appear in pseudo stereo which is objectionable. An alert projectionist can notice the difference after a few seconds and move the film ahead by a half frame thus bringing the images into correct relationship for full stereo. However, it is advantageous to have a means to determine the correct position of the right and left images in the gate.

Accordingly, it is an object of the present invention to provide a stereo conversion system for standard motion picture projectors which will permit the projection of stereoscopic images from a single film strip with little light loss and no modificaton of the projector.

Another object of the present invention is to provide a stereo conversion system for a motion picture projector which will convert the light coming from each of the projected stereo images on a single frame into polarized beams having their planes of polarization normal to each other and in overlapping relationship upon the screen.

A further object of the present invention is to provide a compact, easily adjusted stereo conversion system for standard motion picture projectors, adaptable to the range of projection lenses of different foci, for the range of throw distance and screen sizes usually encountered in motion picture theaters.

Still another object of the present invention is to eliminate the distracting fringe images at the edges of the projection resulting from the two stereo images superimposed upon a screen.

It is another object of this invention to provide a stereo film of maximum image area while eliminating distracting fringe images.

It is another object of this invention to provide indicia or markings to correctly align the right and left images in the film gate while the film is being threaded into projector so that the projected images are always projected in full stereo.

SUMMARY OF THE DISCLOSURE

In one embodiment of the present invention a housing is secured to the projection lens of a standard motion picture projector. The projector is supplied with a motion picture film having a series of abutting stereo pairs thereon. Light from the stereo pairs is directed through two prisms carried by the housing. The prisms are adjustably mounted to enable the stereo pairs to be brought into overlapping relationship upon a theater screen. Light polarizing filters are incorporated with each of the prisms with their planes of polarization at 90° with respect to each other. The prisms are disposed within the housing in close proximity to each other and abutting along one margin.

To accommodate the prism assembly to various screen throw distances and screen sizes, the conventional projection lens is supplemented or replaced by a zoom lens, whereby focus may be re-established along with precise positioning of the overlapped images upon the screen.

The film is printed with an opaque band between the stereo pairs of a single frame. When the pairs overlap the opaque band forms a sharp black edge for the image such as a conventional projection would produce. In addition, any optical interference due to the meeting edges of the prisms in front of the projector is masked by the opaque band.

Indicia marks are provided on the film to enable the positioning of the right and left images on the film in the gate to avoid pseudo stereo projection.

DESCRIPTION OF THE DRAWINGS

In the accompanying drawngs forming part hereof, corresponding parts have been given the same reference numerals, in which drawings:

FIG. 6 is a view taken on line 6—6 in FIG. 4.

FIG. 7 is a view taken on line 7—7 in FIG. 4.

FIG. 8 is a view in vertical section of one of the prisms used in the present invention, somewhat enlarged.

FIG. 9 is a fragmentary sectional view, on an enlarged scale of the prism shown in FIG. 8.

FIG. 10 is a view of the stereo projection converter taken from the rear or projector end thereof.

FIG. 13 is a somewhat diagrammatic view of the complete optical system according to the present invention.

GENERAL DESCRIPTION

Figure 1:
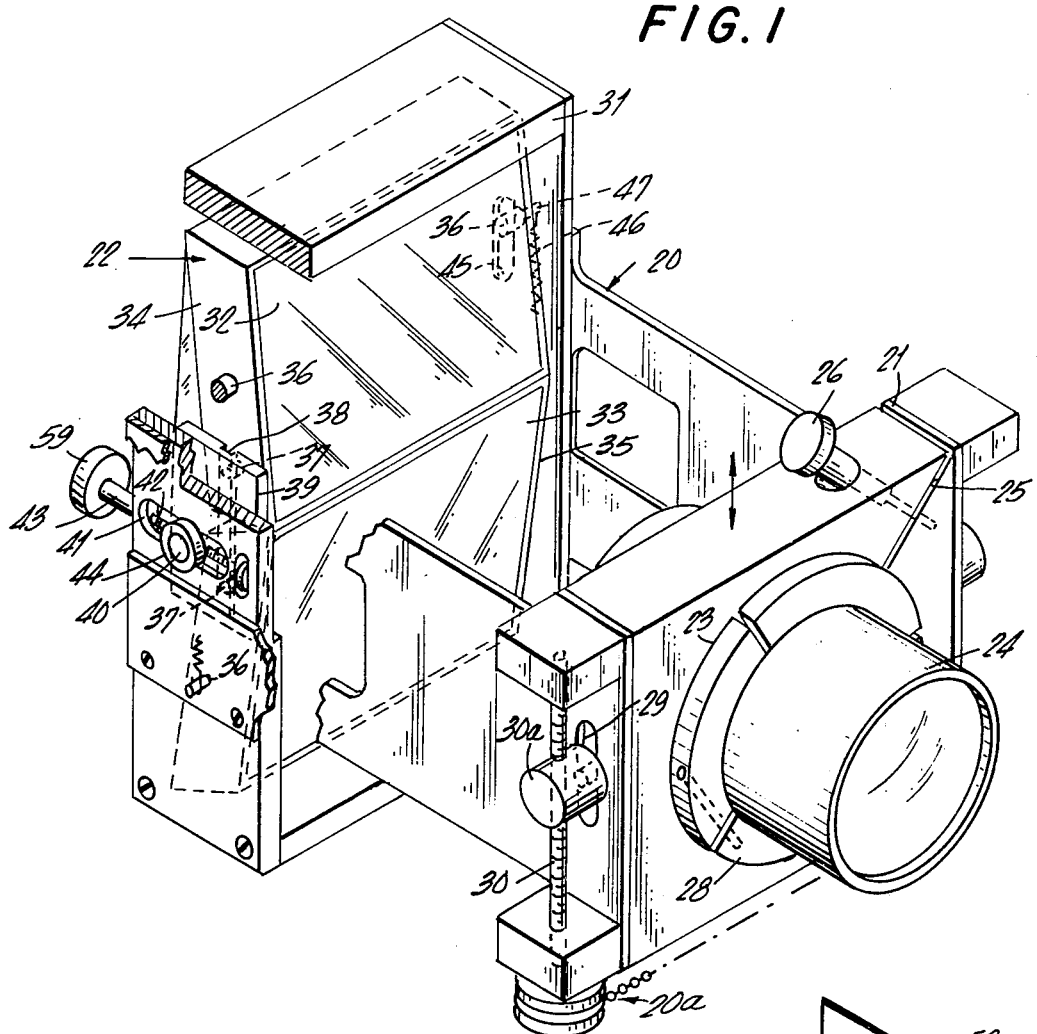
FIG. 1 is a somewhat isometric view, partly broken away, of the projector attachment assembly of the present invention.

Referring to the drawings and particularly to FIG. 1, there is shown a stereo projection converter 20 for attachment to a motion picture projector. The converter is carried within a substantially T shaped housing having a lens attachment block 21 at the rear or projector end thereof and a prism assembly 22 at the front.

The lens attachment block 21 is preferably rectangular and centrally bored as indicated at 23 to receive a lens 24 therethrough. The block 21 is of substantial thickness to provide a good bearing surface for the lens 24. A slit 25 is cut through the block 21 from its periphery to the bore 23. The block is also bored and threaded to receive a tightening screw 26 by means of which the block 21 may be firmly secured to the lens 24.

The lens 24 may be the lens of the motion picture projector 27 or an auxiliary lens 24a, as hereinafter more fully described, which in turn is secured to the projector lens. A split collar 28 may be used around the lens 24 to positively establish the longitudinal position of the block 21 upon the lens 24.

The housing 20 is vertically adjustable with respect to the block 21 and the optical axis of the projector lens system by means of a chain and pulley drive 20a, the slot 29 in the housing and the adjusting screw 30 and traveller 30a which extends through the slot and is threaded into the block 21. One slot 29, adjusting screw 30 and traveller 30a are provided on each side of the housing 20.

The front of the housing 20 is in the form of a rectangular frame 31 within which two prisms 32, 33 are swingably carried. Each of the prisms is secured within holders 34, 35 which extend around the prism margins. Short, outwardly extending stub shafts 36 are carried by the prism holders 34, 35 on each side thereof. The stub shafts 36 are received by the frame 31 and provide pivots upon which the prisms can swing.

Figure 12:
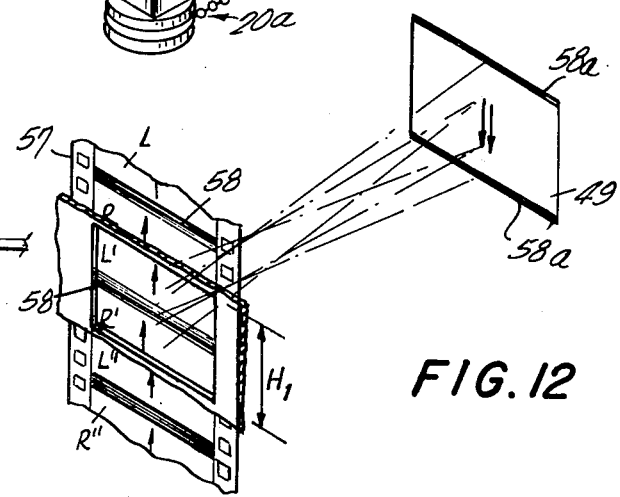
FIG. 12 is an elevational view of a portion of a motion picture film for use in conjunction with the apparatus of the present invention, showing the manner in which the stereo pairs are overlapped upon a screen.

As shown in FIGS. 1–4 the prisms 32, 33 are disposed in abutting relationship with their inner margins touching. In the embodiment illustrated, the prisms are oriented for use with a single strip film in which the stereo pairs are disposed one above the other as shown in FIG. 12. It is within the purview of the present invention, however, to employ single strip stereo film in which the stereo pairs are laterally disposed, in which event the housing 20 and the prisms 32, 33 would be rotated 90° from the position shown in FIG. 1.

Each of the prism holders 34, 35 is provided with a small outwardly extending pin 37 between one of its stub shafts 36 and the margin of the holder which contacts the other prism holder. The pins 37 are received within the elongated slots 38 of a small flat block 39 (see FIGS. 1 and 3). The block 39 is carried between the inner surface of the frame 31 and the outer faces of the prism holders 34, 35.

Figure 11:
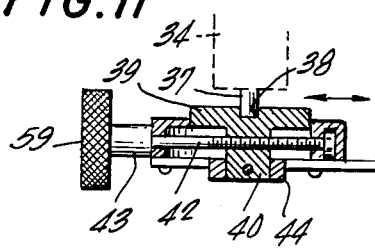
FIG. 11 is a view taken on line 11—11 of FIG. 3.

An outwardly extending arm 40, best shown in FIG. 11, is received within an elongated horizontal aperture 41 in the frame 31. The arm 40 is transversely bored and internally threaded to receive the threaded portion 42 of a prism control member 43. A small roller 44 is freely secured to the end of the arm 40 where it extends beyond the aperture 41 to guide the movement of the block 39 as the knob 59 on the control member 43 is rotated. As the block 39 moves in response to the action of the control member, the pins 37 are urged either toward or away from the projector 27, depending upon the direction of travel. Movement of the pins 37 results in a corresponding movement of the prism holders, and consequently the prisms, upon the shafts 36. In this manner, the prisms can be swung so as to bring the images projected through them into overlapping relationship upon the screen (see FIGS. 6 and 7).

Since the prisms 32, 33 have a certain amount of thickness as shown in FIG. 8, and the prism holders 34, 35 embrace the prisms, it will be apparent that some movement relative to each other must be provided. In addition, the prisms must be held in contact with one another along their inner margins and in line with the optical axis of the system to prevent projection problems. The manner in which this is accomplished is shown in FIGS. 1, 4 and 5.

Figure 5:
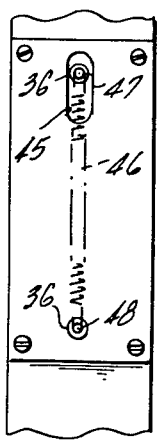
FIG. 5 is a fragmentary view taken on line 5—5 in FIG. 4.
Figure 4:
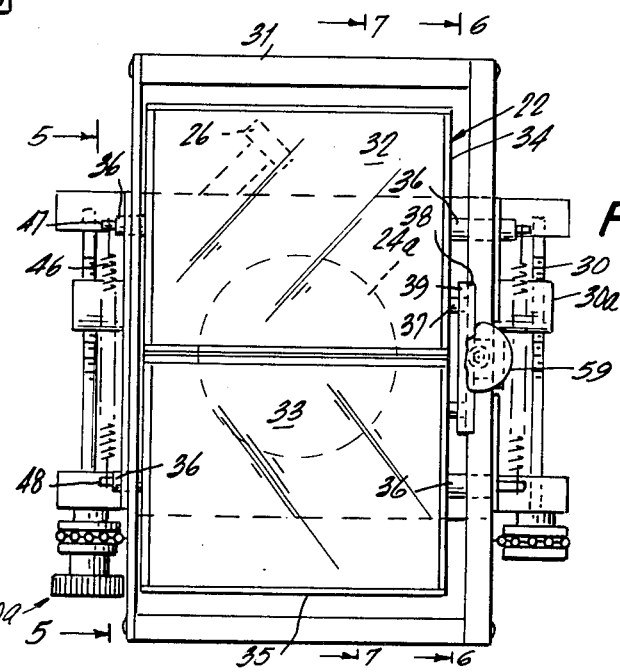
FIG. 4 is a view in front elevation of the stereo projection converter shown in FIG. 3, partly broken away.

It will be seen in FIGS. 1, 4 and 5 that the stub shafts 36 of the upper prism holder 34 are received within an elongated slot 45 in the frame 31. A coil spring 46 is secured at one end to a reduced diameter portion 47 of the stub shafts 36 and at its opposite end to a reduced portion 48 of the stub shaft 36 on the lower prism holder. The spring 46 is loaded so as to urge the prisms together at all times. In order to prevent skewing, the same spring arrangement is provided on each side of the frame 31.

As the prism holders are swung by the control knob 59 in bringing the images into overlapping relationship upon the screen 49, the upper prism holder 34 and its prism 32 can move upwardly or downwardly depending upon the direction of travel without separating the prisms.

When projecting a motion picture film in which the stereo pairs are upon the same frame of the film it is essential to provide as much light as possible to insure an attractive and acceptable display. Since the light output of a standard motion picture projector is limited, adequate light for stereo projection employing a single film strip must be achieved by the reduction of light loss through the stereo converter. In the present invention light losses are minimized by the use of a novel prism arrangement, best shown in FIGS. 8 and 9.

The prism arrangement shown in the drawings comprises a first component of an achromatic prism 50 of high index glass such as flint glass laminated to a second component 51 of the achromatic prism of high index glass such as crown glass. A specific example of an achromatic prism is given by the following combination:

|  | Red<br>C | Yellow<br>D | Blue-Green<br>F |
|---|---|---|---|
| Flint glass | 1.630 | 1.635 | 1.648 |
| Crown glass | 1.527 | 1.530 | 1.536 |

It is preferred that the overall mean index of the prism be of the order of 1.60 to 1.9 so as to obtain a thinner, more compact prism to achieve a given deviation. A linear light polarizing film 50 having a thickness of 0.3 to 0.4 mil and a light transmission of 39 to 40% is next laminated directly to the front or exit surface of the second prism 51 and a protective glass plate 52 is cemented over the polarizer by means of a suitable layer of an optical grade adhesive having high transparency. Since the prisms will heat up during projection, the location of the polarizer is important in preventing strains in the prisms from appearing as distracting patterns in the projected images.

Figure 2:
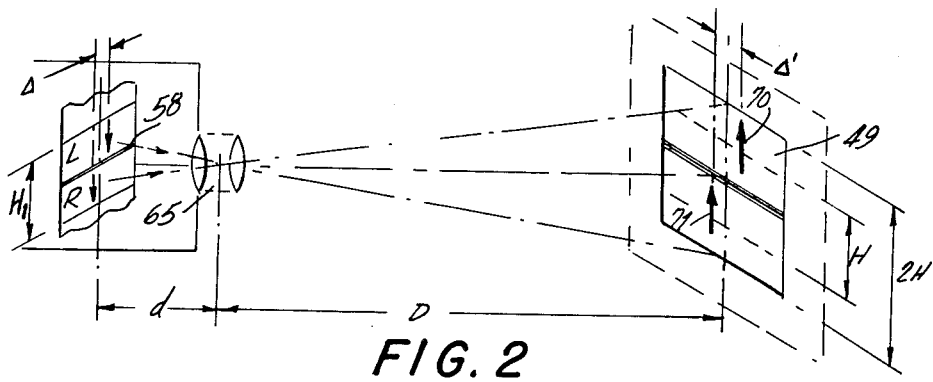
FIG. 2 is a diagrammatic view in side elevation showing the manner in which a stereo pair would be projected upon a screen by a standard motion picture projector in the absence of the prisms employed in the present invention.

The exterior surface 53 of the glass plate 52 is coated with an anti-reflecting coating 54 such as magnesium fluoride. The construction of the prisms 32, 33 is identical but they are oriented with their broad bases 55 abutting each other as shown in FIGS. 2 and 7.

Figure 3:
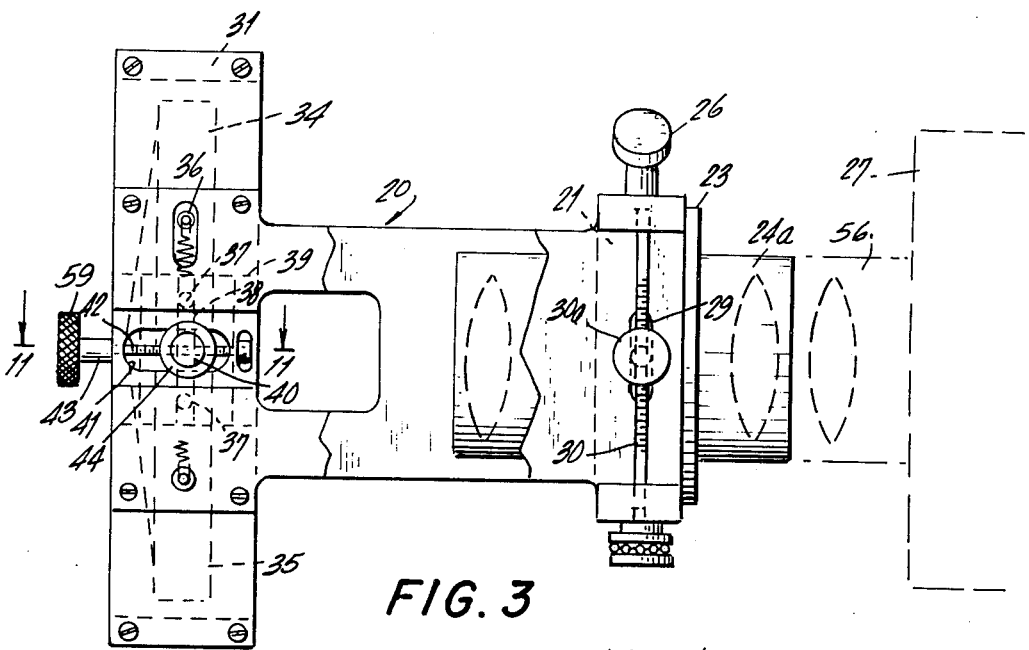
FIG. 3 is a view in side elevation, partly broken away, showing the stereo projection converter of FIG. 1 attached to a projection lens.

In order to fill the screen 49 when the stereo pairs, which are each one half the size of the standard frame, are projected in overlapping relationship, it may be necessary to interpose a wide angle lens or a zoom (vari-focal) lens 24a between the projector lens 24 and the prisms 32, 33 as shown in FIG. 3 or substitute a zoom lens for the projector lens. The lens attachment block 21 is suited for this purpose. It is also within the purview of the present invention to take the stereo pictures through an anamorphic camera lens and thereafter project them through a lens such as a cinemascope lens, well-known in the art.

As will be seen from an examination of FIG. 4, a horizontal obstruction is formed across the beam of light coming from the projection lens 24. This obstruction, consisting of the abutting edges of the prism holders 34, 35 would create a distracting line in the projected image. In addition, since the stereo pairs do not bear identical information due to their left-right displacement, they cannot be brought into register but will display unattractive fuzzy edges at the top and bottom of the picture. It has been found that both of these problems can be overcome, however, by printing the stereo pairs on the film in the manner shown in FIG. 12.

The film 57 used in the present invention consists of a series of stereo pairs LR, L'R', L''R'' separated by an opaque band 58. The opaque band is of the order of 0.3 to 2 mm wide or 2% to 10% of the frame width $H_1$ and serves to mask the horizontal line formed by the abutting edges of the prism frames 34, 35. In addition, as shown in FIG. 12, when the stereo pairs are projected, the opaque band will appear as a sharp dark border 58a at the top and bottom of the image to mask the fuzzy edges which would otherwise be present.

In FIG. 13 there is shown diagrammatically a complete optical system according to the present invention. A conventional film frame 61 modified according to this invention for stereo projection is shown at the left. The film frame 61 comprises a pair of images 62 and 63 one above the other arranged with a horizontal opaque bar 64 between them, the function of which will become clear from the subsequent explanation. A standard projection lens, focused at a distance $d$ from the film plane projects an image at a throw distance D to a screen having a height H. A conventional film frame 61 has a height $H_1 = 18.8$ mm and in projection this is magnified to the screen height H. However, for the purposes of this invention, the projector lens 24 is selected to have a focal length such that the actual projection height is 2H. If projected without the prism assembly of the present invention the film frame 61 would appear as a projected image with a combined projected height of 2H. The prism assembly, however, brings the images 62, 63 into overlapping relationship upon the screen with a projected height of H.

To produce the stereo effect, the stereo images indicated by the arrows 68 and 69 on film frame 61 are laterally displaced by a distance Δ, which is approximately inversely proportional to the distance of the object to the camera lens, (not shown). The arrow 68 appears on the screen as the arrow 70, and the arrow 69 appears on the screen as the arrow 71. These projected stereo images, indicated by the arrows 70 and 71, are correspondingly laterally displaced by a distance Δ'.

As disclosed above, the prism assembly 22 not only brings the stereo images 62, 63 of the frame 61 into overlapping relationship upon the screen but also polarizes the projected images so that their respective planes of polarization are at 90° to each other. This feature is indicated by the diagonal lines 66, 67 on the prisms 32, 33 which criss-cross on the screen 49. It is now apparent that the opaque or dark bar 64 appears on the upper and lower edges of the screen 49 as sharp black lines 64a which effectively frame the images at these edges. If the black lines were too narrow or nonexistent, portions of the overlapped images would appear along the edges and produce an undesirable distracting fringe.

The functioning of the device may be understood from FIG. 13 by the following: displaced stereo images indicated by the arrows 68 and 69, on upper and lower images 62, 63 respectively, are projected upon the screen 49 as overlapped image pairs, 70 and 71. In projection, the image 70 is polarized at +45° and the image 71 is polarized at +135° and these images correspond to the right and left eye images, respectively. The viewer wears polarized spectacles 80 having a right eye lens 81 polarized at +135° and a left eye lens 82 polarized at +45°. Thus, the left eye lens will admit only the upper image 62 and the right eye lens will admit only the lower image 63 on the film.

Since the images are displaced at the screen 49, the lines of sight to the view of these projected images crosses over in front of the screen plane at point 83. The two arrows 70 and 71 are seen as a single object at an apparent depth indicated by the fused arrow 84 which passes through point 83 at a distance δ from the front of the screen 49. The displacement of arrows 70 and 71 at the screen is Δ'. The interocular distance of the observer's eyes is $d_e$ and δ is the apparent distance of the object 84 from the screen 49.

The vertical line through the prism assembly YY' bisects the angle θ which is the angle between the front surfaces of the prisms. This angle θ is adjusted to control the vertical displacement of the overlapped image pairs into precise alignment.

To convert a standard motion picture projector to a stereoscopic projector employing the above described apparatus, it is merely necessary to attach the converter to the projection lens 24 of the projector by slipping it into the lens attachment block 21 or by coupling the lens 24 to the wide angle or zoom lens 24a in the manner indicated in FIG. 3. Thereafter, with the film 57 threaded through the projector in operation, the control knob 59 is turned to bring the stereo pairs into overlapping alignment upon the screen. When viewed through spectacles having lenses of light polarizing material disposed with their planes of polarization normal to each other, the projected images will appear three dimensional.

Figure 14:
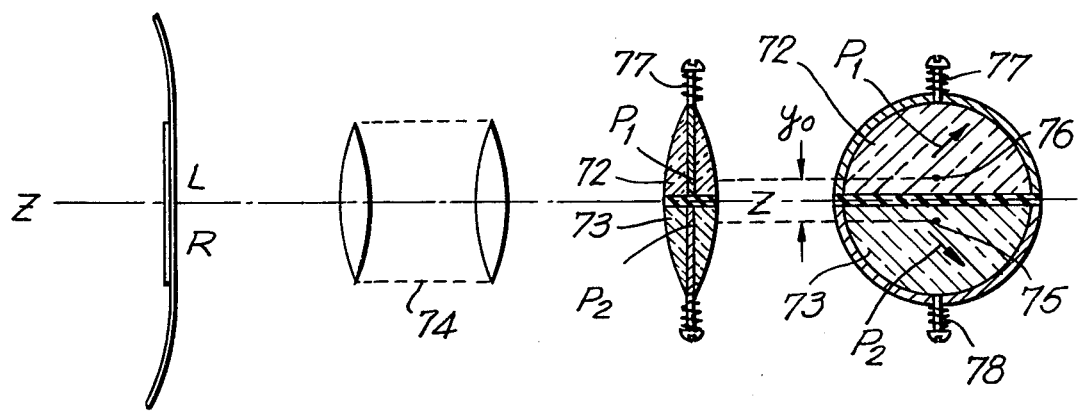
FIG. 14 shows an alternate construction of the converter assembly.

FIG. 14 shows another embodiment of this invention, a further improvement or alternate construction of converter assembly which has the advantage of a simplified adjustment mechanism. In FIG. 14, in lieu of prisms, two lenses 72 and 73 are mounted forward of the projection lens 74.

Polarizers $P_1$ and $P_2$ are provided with their polarizing axis mutually at right angles. These may be laminated to lenses 72 and 73 or may be provided as separate elements. Upper lens 72 has its optical center 75 below the optical axis ZZ' and lower lens 73 has its optical axis 76 above the obtical axis ZZ'. The distance $y_0$ between optical centers 75 and 76 is adjustable. An adjustment means, for example, screws 77, 78 on the frame of a converter similar to that shown in FIG. 1, varies the distance $y_0$ between the optical centers of the lenses by an opposite vertical motion of the optical centers. This causes the right and left images projected upon the screen to be overlapped and vertically adjustable until they are in alignment.

Figure 15:
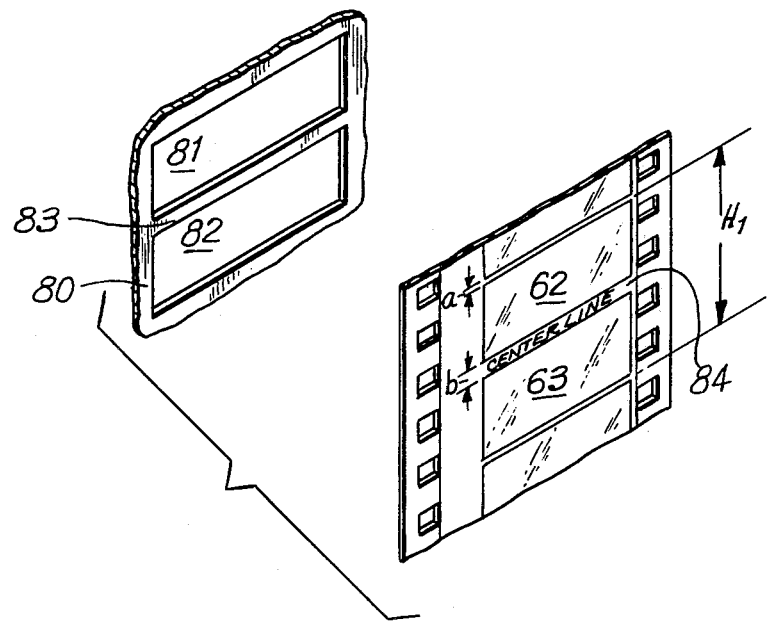
FIG. 15 shows an isometric exploded view of a special gate and film which provides the dark bar separator strip on the gate between the right and left images and an indicia marking on the film image separator strip.

FIG. 15 shows an exploded isometric view of a novel film gate and stereo film of this invention; in which the gate 80 has a dark bar 83; which is in lieu of providing the dark bar on the film. The gate 80 has open areas 81 and 82, which provide apertures for the pair of stereo images 62 and 63 on the film. In such case, the film may be printed with or without a dark bar 85. The space 85 which is covered by the film gate dark bar 83 may contain an indicia comprising white dats, or the word "center" printed thereon, to enable the operator to identify the position of the film, and thus avoid pseudo stereo projection.

Figure 16:
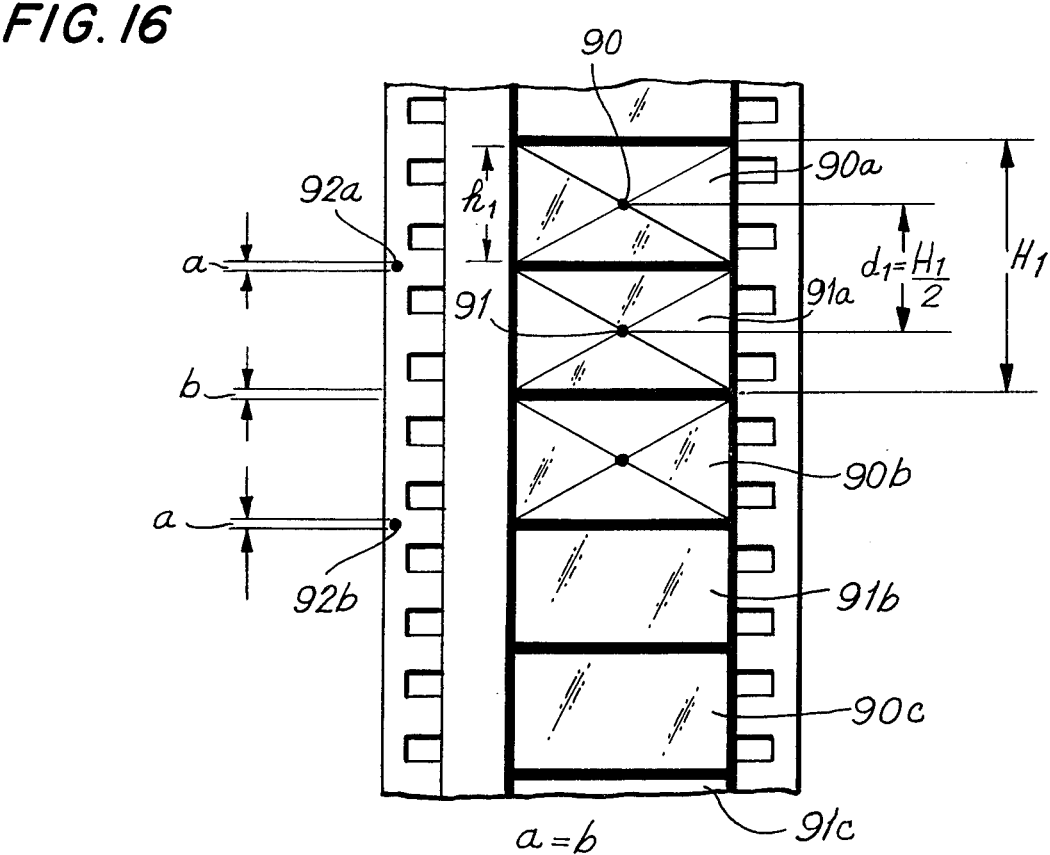
FIG. 16 shows a film with equal spacing dark bars and an indicia mark on the film edge.

FIG. 16 shows a film and standard gate, with indicia markings placed at the edge of the film to predetermine the alignment of right and left images for projection in stereo, and to avoid pseudo stereo. The stereo pairs are 90a and 91a, 90b and 91b, etc. The stereo image centers are 90 and 91, respectively. A continuously printed instruction in, for example, a reflective white ink, "top", "bottom", "up", "down", or suitable dots 92a, 92b, or colored strip may be placed at the edges and masked by the gate. Alternatively, a fluorescent dye may be printed over the dark bar and seen when illuminated with an UV light near the film gate.

Figure 17:
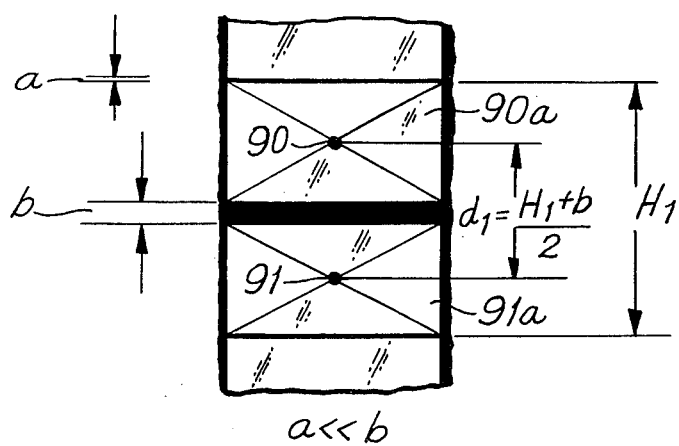
FIG. 17 shows a film with centered dark bar and image separator to provide a maximum film area.

Another film format is shown in FIG. 17, as printed in FIGS. 12 or 13. In FIG. 12 there is a thin line of minimum thickness between the images R' and L'' on successive image pairs. An advantage of the dark bars alternating with separators with lines of minimum widths (less than 1% of the film gate width; preferably κ% or less) is that a maximum area of film is utilized for the image resulting in improved image resolution. In FIG. 13, the stereo film shown is printed with a dark bar 64 between the stereo pair images 62 and 63; and a thinner dark separator line between adjacent pairs of stereo images. In this stereo film format the wide dark bar is itself the indicia. The edge of the aperture plate is aligned on the thin lines between the right and left images. Instructions may be placed on the film or externally, indicating that the wide dark bar is to be placed in the center of the aperture.

In FIGS. 16 and 17:
$a$ = width of the separator line between successive frames, in which each frame contains a stereo image pair.
$b$ = width of the dark bar between an image pair.
$d_1$ = distance between corresponding points of a pair of stereo images.
$H_1$ = the distance between successive frames
$h_1$ = image height
In FIG. 16, $a = b$ and the distance between corresponding points of stereo pairs:

$$d_1 = H_1/2 \tag{1}$$

The image height is:

$$h_1 = (H_1 - 2b)/2 \tag{2}$$

For the film format shown in FIG. 17, $a << b$, and the distance between corresponding image points of stereo pairs is;

$$d_1 = (H_1 + b)/2 \tag{3}$$

Each image height is;

$$h_1 = (H_1 - b)/2 \tag{4}$$

The width $b$ of the dark bar relative to the height of a right or a left stereo image is;

$$0.03h_1 < b < 0.1h_1 \tag{5}$$

Subject to condition (5), the format of FIG. 16 is defined by:

$$a = b \qquad (6)$$

Subject to condition (5), the format of FIG. 17 is defined by:

$$a < 0.1b \qquad (7)$$

Comparing equations (2) and (4) for FIGS. 16 and 17 respectively; the film format shown in FIG. 17 has maximum area utilization.

For example, using a 35mm motion picture film;

$$H_1 \approx 19 \text{ mm } H_1/2 \approx 9.5 \text{ mm}$$

Substitution of these values in the above equations gives all the dimensions of the film format described.

Another method of providing indicia is to modify the sprocket holes to provide an extra or differently shaped sprocket hole; or to modify the film edge as by a cut, indentation, or the like.

An indicia marking may be provided as a colored transparency at the edge of the image outside of the projected frame line; for example, a red dot or line can be provided on the outside of the frame of one of the images, and a green dot or line on the outside of the frame of the other image. These are projected upon an external mask with a white surface, for example, a strip of opaque tape placed over the porthole. Thus, if the operator sees the red and green dots in correct relationship, for example up and down respectively, he knows the film is framed for true stereo projection; while if the reverse is the case, this signals the need for reframing by one-half a standard frame to change from pseudo to true stereo.

An aperture plate may be provided with suitable perforations outside of the frame aperture for the projected indicia.

If the film is spliced incorrectly by a half frame, the operator may not be aware that the projected images have suddenly changed from true to pseudo stereo. An alert operator is required to make sure that the projection is in true stereo at all times. This difficulty is preferably avoided by prescreening the film, and making sure it is spliced correctly.

Figure 18:
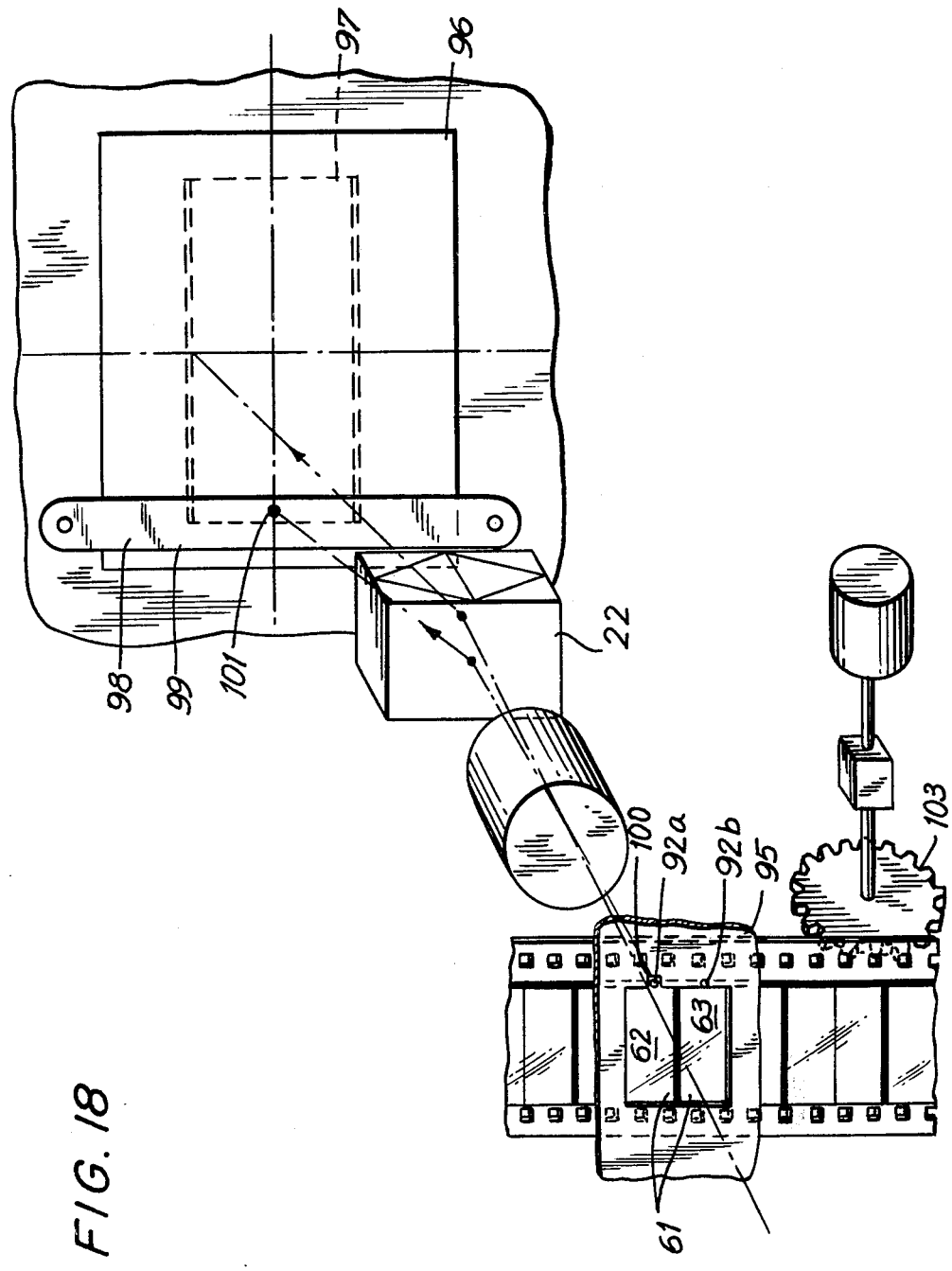
FIG. 18 shows an isometric exploded view of the film with the indicia marks and means for displaying the indicia marks.

FIG. 18 shows a film frame 61 having right and left stereo images 62 and 63 respectively. Just beyond the vertical edge of the frame 61 there are transparent colored dots 92a and 92b at the center lines of each of the stereo images. For example, the dots 92a and 92b may comprise green or red transparencies. The dot 92b is hidden by the edge of the aperture plate 95, but the dot 92a appears in the aperture due to a small perforation or hole at the edge of said aperture plate. As previously described herein, the lens 24 projects the images, and the optical device 22 polarizes and overlaps the images which are then projected through the porthole 96. The cross section of the projected beams 97 is within the porthole. The dot 92a would be transmitted through the porthole, but however, is stopped by an opaque strip 98 which has a reflecting surface 99 and which is suitably fastened on the porthole wall. In operation, the colored dot in the portion of the aperture at 100 appears as a projected image 101 on the reflective surface 99. The operator can see immediately whether this dot is red or green. If the dot is green the operator immediately knows that the film is being projected in true stereo; if the dot is red, the operator immediately knows that the picture is being projected in pseudo stereo; and, in the latter case, the operator should then manually adjust the framing knob 102, shown diagrammatically, which shifts the sprocket 103 and the frame by one-half a full frame and the relected image then changes from red to green and from pseudo stereo to true stereo. All of this takes place while the show continues and there is no need to stop the machine to readjust the film.

The indicia marks provided according to this invention may be used to automatically frame the film without the intervention of the operator to project stereo images, and to avoid pseudo stereo.

To assure the projection of true stereo and to avoid pseudo stereo, a photo or other type of sensor is positioned to sense the indicia. Signals from the sensor control the framing device via an electrical circuit and electromechanical actuator; using well-known components.

In FIG. 1, the polarizers may be separate from and not laminated to the prisms. All glass-air interfaces may be anti-reflection coated.

From the foregoing it will be seen that there has been provided a stereo converter for standard motion picture projectors which is compact, easy to attach to the projector and which will produce a three-dimensional display of a quality and brilliance superior to prior art devices; and a stereo film which may be used on standard projectors, and which may be readily aligned to avoid pseudo stereo, and assure immediate projection in full stereo vision.

Various modificatons may be made by those skilled in the art without departing frm the scope of this invention.

Having thus fully described the invention what is claimed and sought to be protected by U.S. Letters Patent is:

1. In a motion picture projection system for the projection of 3-dimensional pictures, a motion picture projector adapted therefor, a gate in said motion picture projector, a single strip motion picture film positioned in said projector, said motion picture film comprising a succession of frames, a right stereo image and a left stereo image positioned within each said frame, a dark bar strip between said right and said left images positioned at the center of said frame, and an indicium mark on said film to predetermine the location of the said right and left images in said gate, a projected image including an image of said indicium at an edge thereof, a reflecting mask at an edge of the projected image, the said mask blocking and displaying said indicium only, the reflected image of said indicium on said mask being an indicator that the projected image is in true stereo.

2. A motion picture projection system for the projection of 3-dimensional pictures according to claim 1, in which there are two indicium marks, a first indicium mark relating to said right image and a second indicium mark relating to said left image, said first and second indicium markings being optically distinguishable from each other.

* * * * *